April 2, 1935.  A. A. HAAS  1,996,291
AIR VALVE
Filed Sept. 15, 1934  2 Sheets-Sheet 1

Inventor
A. A. Haas
By Watson E. Coleman
Attorney

April 2, 1935. A. A. HAAS 1,996,291
AIR VALVE
Filed Sept. 15, 1934 2 Sheets-Sheet 2
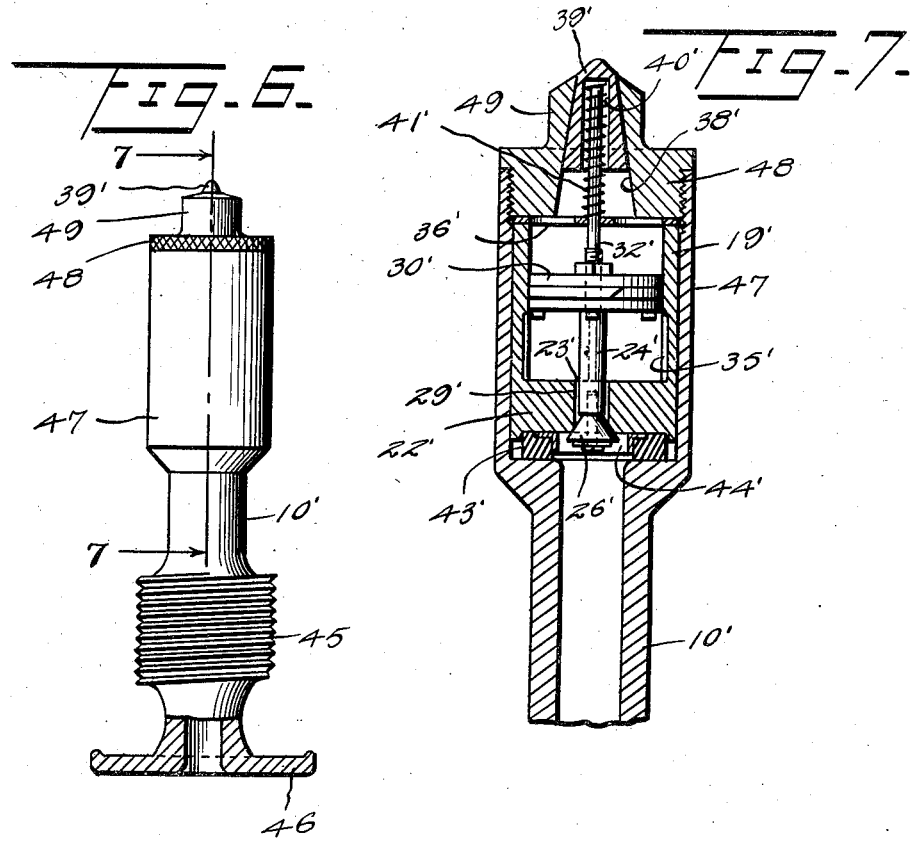
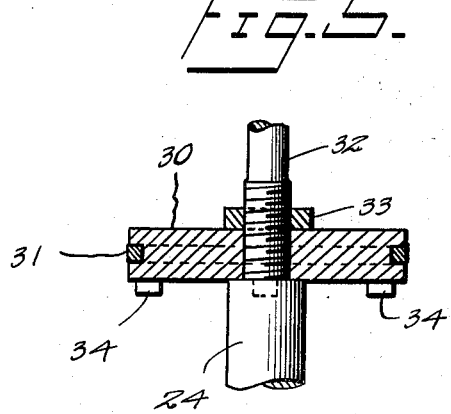
Inventor
A. A. Haas
By Watson E. Coleman
Attorney Patented Apr. 2, 1935

1,996,291

UNITED STATES PATENT OFFICE 1,996,291

AIR VALVE

Albert A. Haas, Macon, Ga.

Application September 15, 1934, Serial No. 744,215

3 Claims. (Cl. 152—12)

This invention relates to air valves and more particularly to a dust and dirt proof air valve for use with pneumatic tubes or other pressure devices.

An object of this invention is to provide an improved type of air valve which is adapted to take the place of the conventional valve insides at present in use in valve stems, and which is so constructed as to eliminate the necessity of caps over the valve stems while at the same time preventing entrance of dust or dirt into the interior of the stem.

Another object of this invention is to provide a device of this kind which is exceedingly simple in construction and which may be easily and cheaply manufactured.

A further object of this invention is to provide a valve structure of this kind which is held in closed position by the pressure within the tube or container and which may be moved into open position by movement of the dust and dirt preventing member inwardly of the device.

The above and various other objects and advantages of this invention will in part be described and in part be understood from the following detailed description of the present preferred embodiment, the same being illustrated in the accompanying drawings wherein:—

Figure 5 is a vertical section partly in detail of the operating piston for the air valve.

Figure 6 is a detail side elevation partly in section of a modified form of valve stem.

Figure 7 is an enlarged sectional view taken on the line 7—7 of Figure 6.

Figure 1:
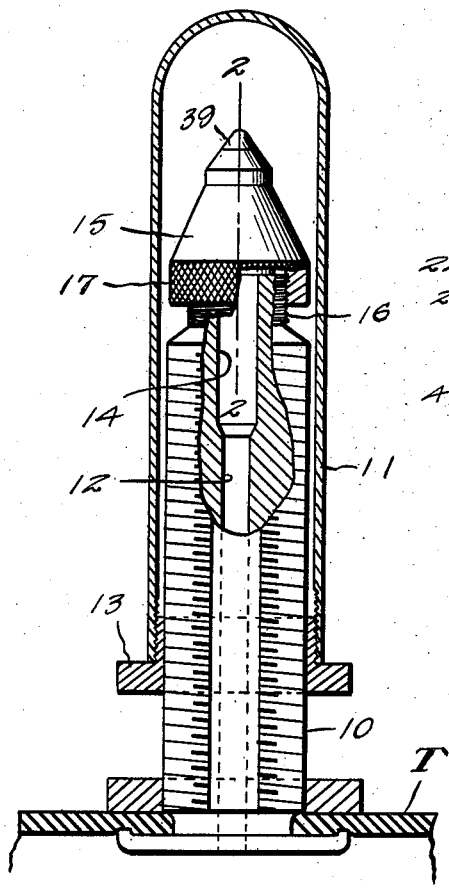
Figure 1 is a longitudinal section partly in detail of a conventional valve stem and valve stem cap having a device constructed in accordance with my invention, mounted thereon.
Figure 2:
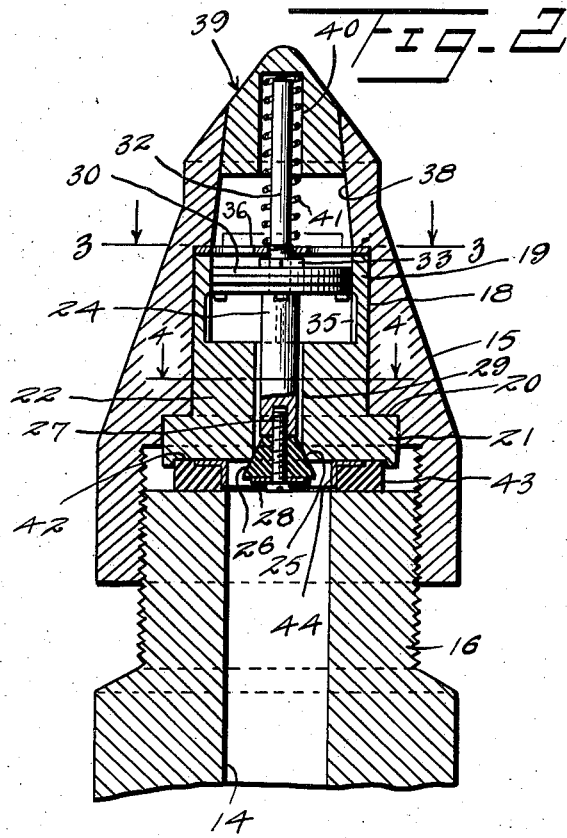
Figure 2 is an enlarged sectional view taken on the line 2—2 of Figure 1.
Figure 4:
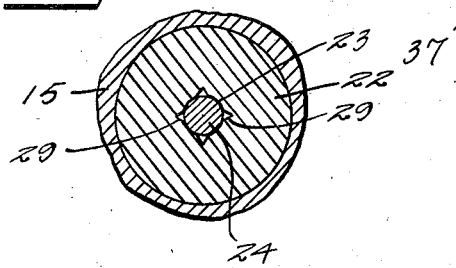
Figure 4 is a fragmentary sectional view taken on the line 4—4 of Figure 2.
Figure 3:
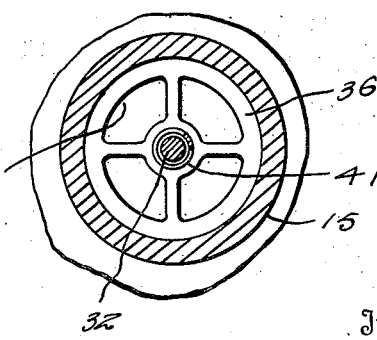
Figure 3 is a fragmentary sectional view taken on the line 3—3 of Figure 2.

Referring to the drawings, the letter T designates generally a tube or container for receiving air or other liquid under pressure, and the numeral 10 designates a conventional valve stem which is secured in any desired manner to the tube or container T. A shield or cap 11 is disposed about the stem 10 and is removably mounted on a rim nut 13, which is threaded onto the periphery of the stem 10. This construction is conventional and is here shown as merely one application of the air valve structure to be hereinafter described.

The valve stem 10 has a bore 12 extending longitudinally therethrough and an enlarged bore 14 is provided adjacent the outer end of the stem 10 and in this bore 14, the conventional valve insides are adapted to be positioned. However, in the present instance, the valve insides are removed and in order to retain pressure in the container or tube T, I have provided an air valve structure comprising a cap or housing 15, which is threaded onto the reduced upper end portion 16 of the valve stem 10. This cap or housing 15 is, in the present instance, knurled or serrated, as at 17, so as to facilitate the manual mounting or removal of the housing 15 from the stem 10.

The housing 15 has a bore 18 therein and a cylindrical member 19 is disposed within this bore, and in the present instance, the bore 18 is enlarged, as at 20, so as to provide a shoulder or seat for a flange 21 integral with the cylindrical member 20. The inner end 22 of the cylindrical member 19 is closed and a bore 23 is provided axially of the closed end 22 to slidably receive a valve stem or guide member 24. The closed end 22 of the housing or cylindrical member 19 has a tapered valve seat 25 against which a yieldable valve member 26 of tapered construction engages. This valve member 26 is secured as by a screw or other attaching means 27 to the inner end of the stem 26, and preferably a metal plate 28 is interposed between the head of the screw 27 and the inner end of the valve 26.

The bottom or inner end of the member 19 is also provided with a plurality of air passages 29 extending laterally of the bore 23, so that air may pass by the stem 24 when the valve 26 is in open position. The housing or cylindrical member 19 has a piston 30 slidable therein and this piston 30 has a peripheral groove intermediate the upper and lower ends thereof, as shown in Figure 5, in which a ring or sealing member 31 is disposed so as to seal the piston 30 in the cylinder or housing 19. The piston 30 is secured to the reduced upper end portion 32 of the stem 24, being held by means of a lock nut 33. Preferably, the lower or inner side of the piston 30 has a plurality of lugs 34 secured thereto or made integral therewith.

The cylinder 19 adjacent the inner end thereof is provided with a plurality of air passages 35, so that when the cylinder 30 moves inwardly to a position opposite the air passages 35, air may freely pass through these passages 35 and then down through the air passages 29 and past the valve 26 into the tube or container T. The lugs 34 prevent the piston from contacting with the flat upper surface of the inner end 22 so that an air passage is formed on the under side of the piston 30 when this piston is moved inwardly into engagement with the inner end 22 of the member 19.

A plate 36 is disposed on the upper end of the cylindrical member 19 and is provided with a plurality of air passages 37. The reduced stem portion 32 slides through the center of this plate 36.

The upper end portion of the housing 15 has a tapered passage or bore 38 providing a tapered seat which is engaged by a tapered plug or dust and dirt preventing member, generally designated as 39.

This tapered member 39 has a bore or axial opening 40 therein in which is received the upper end of the reduced stem portion 32 and in addition thereto, an expanding spring 41 is partially disposed in the opening 40 and engages loosely about the reduced stem portion 32 and acts to constantly urge the plug 39 into closed position. The inner end of the spring 41 engages the top of the plate 36.

The inner end of the member 19 has a recess 42 in which is received a gasket 43 and this gasket 43 has a retaining flanged ring or annulus 44 to prevent inward distortion of the gasket 43, which inward distortion might tend to prevent free movement of the valve member 26 into open or closed position. The gasket 43 is adapted to engage the top of the reduced stem portion 16 so as to seal the housing 15 on the outer end of the valve stem member 10.

In the embodiment shown in Figures 6 and 7, the stem 10' has a threaded inner portion 45 and an enlarged rib or flange 46 so that the stem 10' may be secured to a conventional container such as a flexible tube or the like. The outer portion of the stem 10' has a cylindrical housing 47 integral therewith and a cylinder 19' is mounted within this housing 47. The cylinder 19' is similar in construction to the cylinder 19, being provided with air passages 35' adjacent the inner end of the cylinder 19' and also with air passages 29' extending laterally of the opening 23' for the valve stem member 24'. A yieldable valve member 26' is secured to the inner end of the valve stem 24' and a piston 30' is secured to the stem 24' in the same manner as the piston 30.

A cushioning or sealing member 43' is carried by the inner end of the cylindrical member 19' and seals the cylindrical member or housing 19' in the housing 47'. A perforate plate 36' engages the upper end of the cylinder 19 and a threaded plug 48 is threaded into the upper end of the housing 47 and fixedly holds the cylinder 19 within the housing 47.

The plug 48 has a reduced extension 49 extending upwardly therefrom and this extension 49, together with the body of the plug 48, has a tapered bore or passage 38' forming a seat for a valve plug 39' similar to the plug 39. A spring 41' is disposed about the reduced stem portion 32' and at one end engages against the top of the plate 36 and extends into a passage 40' in the plug 39' so as to constantly urge this valve plug 39' into closed position.

In the use and operation of the air valve hereinbefore described, where the valve is mounted on a conventional valve stem 10, the conventional valve insides are removed and the cap or housing 10 is threaded onto the reduced portion 16 of the stem 10. When it is desired to place air or other liquid in the tube or container 10, the pressure device is applied to the plug 19 and this plug 19 is manually forced inwardly so as to unseat this plug 39 and at the same time, the outer or upper end of the reduced stem portion 32 is engaged by the plug 39 and the stem 32, together with the piston 30 and the valve 26 moved inwardly until the piston 30 uncovers the air passages 35. At this time, the valve 26 is in open position and the air or other liquid may then freely pass through the housing 15 and into the stem 10 and the container T. The amount of pressure can also be tested by applying the gauge to the plug 39 which will force the piston 30 inwardly and move the valve 26 into partially open position so that air or other liquid may freely move outwardly to cause the gauge to register the pressure in the container T.

It will be apparent from the foregoing that the valve 26 is held in closed position by the pressure in the tube or container T and initially the valve 26 is moved into partly closed position by the pressure engaging the piston 30 and acting to force this piston 30 outwardly until the periphery of the piston 30 moves beyond the air passages 35 and at this time, the valve 26 will also be in closed position on the seat 25.

What is claimed is:—

1. An air valve, comprising a housing, a cylinder in the housing, a wall on the inner end of the cylinder provided with an opening therethrough and having a valve seat on the inner end of the opening, said cylinder having an air passage in the wall thereof adjacent the inner end of the cylinder, a valve member, a piston slidable in the cylinder and having a length less than the length of the air passage whereby to permit the movement of air past said piston when said piston is adjacent the inner end of the cylinder, a connecting member connecting the valve with the piston for movement therewith, said first named wall having an air passage laterally of said opening whereby the air pressure against the inner side of the piston will move said piston and valve to closed position, a closure member outwardly of said piston, a spring constantly urging said closure member to closed position, and means engageable with said closure member and said piston for moving said piston to open position simultaneously with the movement of the closure member to open position.

2. An air valve, comprising a housing having a threaded bore adjacent one end thereof and provided with a tapered opening adjacent the other end thereof, an inner housing disposed in said first housing, a cylinder in said inner housing, said inner housing having an inner wall provided with an axial opening communicating with the cylinder, a valve seat in said wall, a valve for said seat, said cylinder having a plurality of laterally disposed air passages adjacent the inner end thereof, a piston slidable in said cylinder and having a length less than the length of the air passages whereby upon movement of said piston adjacent the inner end of the cylinder air may pass about the periphery of said piston, lugs on the inner face of said piston to limit the inward movement of said piston, a tapered plug disposed in said tapered opening of said first housing, a spring constantly urging said plug to closed position, and a member secured to said piston and extending in the direction of said plug whereby to move said piston to open position upon inward movement of said plug.

3. An air valve, comprising an outer housing of substantially cylindrical construction, an inner housing, a cylinder in said inner housing, an inner end wall carried by said inner housing provided with an axial opening therethrough, a valve seat in said end wall on the inner side thereof, a valve for said seat, said cylinder having a plurality of laterally disposed air passages adjacent the inner end thereof, a piston slidable in said cylinder and having a length less than the length of said air passages whereby air may pass about the periphery of said piston when said piston is adjacent the inner end of the cylinder, lugs limiting the inward movement of the piston, a perforate guide plate engaging the outer end of the cylinder and provided with an axial opening, a stem secured to said piston and extending through said opening of said plate, a plug threaded into the outer end of said outer housing, said plug having a tapered axial opening therethrough, a tapered closure of said plate, a plug threaded into the outer end engaging against the outer end of said stem, and a spring disposed about the stem constantly urging said closure to closed position.

ALBERT A. HAAS.